R. HAMILTON.
ROAD SCRAPER.

No. 105,567.  Patented July 19, 1870.

ATTEST.
Jas. H. Layman.
William Bauer

INVENTOR.
R. Hamilton

United States Patent Office.

ROBERT HAMILTON, OF FRANKLIN, INDIANA.

Letters Patent No. 105,567, dated July 19, 1870.

IMPROVEMENT IN ROAD-SCRAPERS.

The Schedule referred to in these Letters Patent and making part of the same.

I, ROBERT HAMILTON, of Franklin, Johnston county, Indiana, have invented a new and useful Road-Scraper, of which the following is a specification.

Nature and Objects of the Invention.

The present invention is an improvement on the road-scraper patented to me on the 26th day of January, 1869, and the 18th day of January, 1870, and relates to a construction of runners and frame which greatly increases the efficiency and durability of the implement.

General Description with Reference to the Drawing.

The beam A A' A'' is of iron, and consists of a curved bar, A, which, toward its rear end, separates into two branches, A' A'', as represented.

To the branches A' A'' are pivoted two curved runners, B B', that are riveted or otherwise firmly united to the under side of the scoop or shoe C, to whose curved rear portion the branches A' A'' of the frame closely correspond and fit.

Of the two rods or braces D E, which serve to connect and stiffen the two branches A A'', the lower rod D serves as a pintle for the hook or latch F, which holds the scoop, and the upper rod E, as a support for said latch in its open condition.

The latch F may close by a spring, as in my patent aforesaid, or by its gravity simply, as in the present illustration, and may be released by means of a trigger, G, connected to said latch by a chain, H.

The handles I I' may be of wood, and be attached to the beam by bolt or rivet J, passing through their front ends, and by oblique braces K K' at their rear ends.

Figure 1:
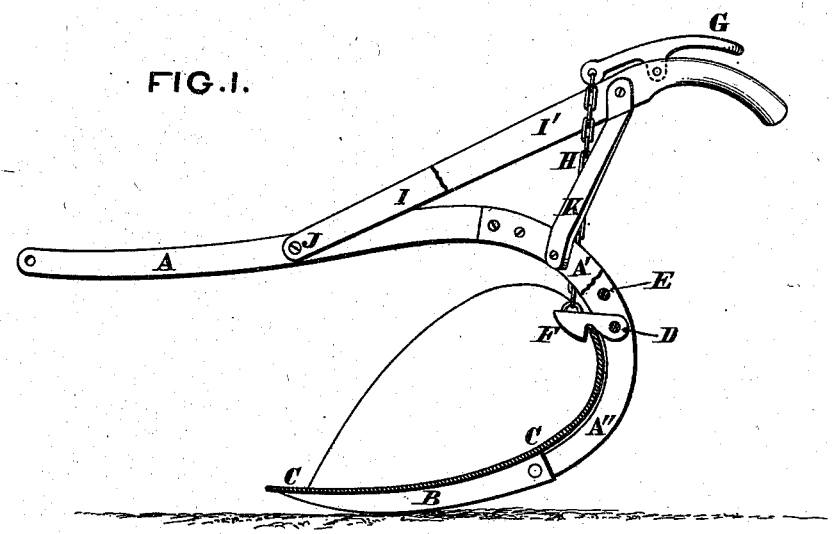
Figure 1 is a side elevation of a road-scraper embodying my invention, the scoop being locked, one of the handles being broken off, and the scoop being shown in section.
Figure 2:
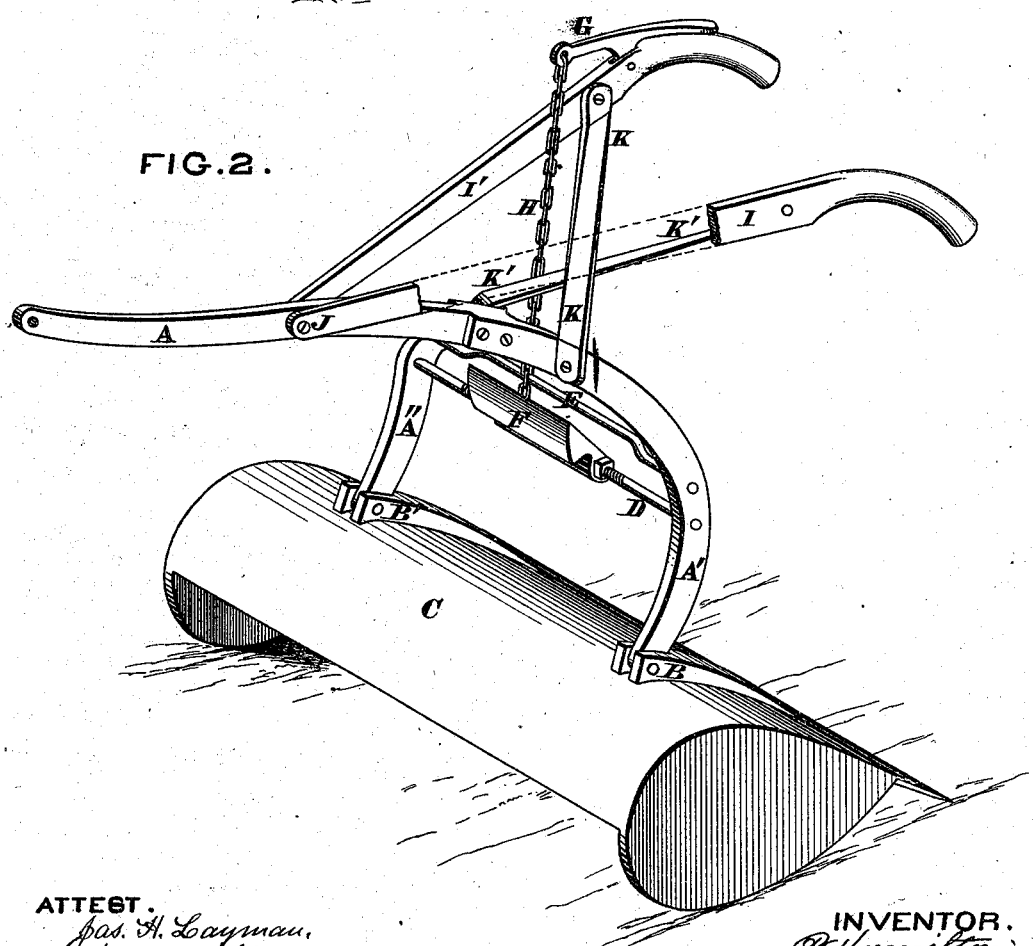
Figure 2 is a perspective view of the same, the scoop being released, and a portion of one handle removed.

The runners B B' serve to stiffen the scoop, and to prevent its contact with the ground in transit from place to place, (see fig. 1,) and limit the extent of its opening, (see fig. 2.)

Claims.

I claim herein as new, and of my invention—

1. The described arrangement of curved and forked beams A A' A'', and curved runners B B', fixed to the under side of the scoop C.

2. In combination with the forked beam A A' A'', curved runners B B', and scoop C, the brace-rods D and E, and latch F.

In testimony of which invention I hereunto set my hand.

ROBERT HAMILTON.

Witnesses:
 EPHRAIM JEFFERY,
 O. C. DUNN.